2,715,138
PRODUCTION OF ADIPONITRILE

George B. Crane, Wilmington, Del., assignor to E. I. du Pont de Nemours and Company, Wilmington, Del., a corporation of Delaware No Drawing. Application April 30, 1954,
Serial No. 426,934

5 Claims. (Cl. 260—465.8)

This invention relates to the manufacture of adiponitrile. More particularly, it relates to the manufacture of adiponitrile by the cyanation of 1,4-dichlorobutane using preformed adiponitrile as a solvent for the reaction mixture.

It has heretofore been proposed, as in German Patent 881,340 (1953), to carry out the cyanation of 1,4-dichlorobutane in anhydrous adiponitrile. It has also been proposed to utilize aqueous adiponitrile as the solvent for the cyanation reaction. While good yields may be obtained from such processes, especially from those accomplishing the reaction in aqueous adiponitrile, it still remains desirable to increase the yields and, more particularly, to repress the formation of by-product ethers and tars.

A major object of this invention is, therefore, generally to improve prior art processes for the cyanation of 1,4-dichlorobutane in adiponitrile. Another object of the invention is to improve the yield obtainable when the cyanation of 1,4-dichlorobutane is carried out using aqueous adiponitrile as the cyanation solvent. A further object of the invention is to repress the formation of by-products in the cyanation of 1,4-dichlorobutane.

The above-mentioned and still further objects of the invention may be accomplished by a procedure in which prior art processes are modified by the inclusion of calcium chloride as an additive in the reaction mixture. In a preferred mode of practicing the invention, an aqueous solution of sodium cyanide containing a predetermined amount of calcium chloride is added to a liquid mixture of 1,4-dichlorobutane and adiponitrile and the desired cyanation carried out. For best results, the cyanide solution should contain about 30–40% by weight of sodium cyanide and about 3–30% of calcium chloride. Cyanation temperature and other conditions may be essentially those employed heretofore.

The invention will be understood in more detail from the examples which follow.

Example 1

This example illustrates the results obtained in the absence of the calcium chloride additive and is given solely as a basis for comparison.

A 35% aqueous solution of sodium cyanide was added, with stirring, to a mixture of 1,4-dichlorobutane and adiponitrile. A slight excess of sodium cyanide was employed, the total amount approximating 111% of the theoretical. The reaction temperature was 140° C. and the pressure was 760 mm. Excess water was allowed to flash off as shown in co-pending application Serial No. 408,582, filed February 5, 1954. The adiponitrile yield was 88.1% and conversion to adiponitrile was 74.6%. Conversion of 1,4-dichlorobutane to adiponitrile and the intermediate chlorovaleronitrile was 83.5%. 6.49 pounds of ethers and 6.97 pounds of tars were formed for each 100 pounds of adiponitrile produced.

Example 2

This example shows the effect of adding calcium chloride to the reaction system.

The run of Example 1 was essentially repeated except that when the sodium cyanide solution was made up, 15.6% of the weight of the cyanide was replaced with calcium chloride, calculated as the anhydrous chloride. Yield of adiponitrile was 91.3% at a conversion to adiponitrile of 74.7%. Total conversion to adiponitrile and chlorovaleronitrile was 85.2%. Ethers were reduced to 3.92 and tars to 5.57 lbs./100 lbs. of adiponitrile formed.

It is evident from Example 2 that the use of calcium chloride not only increases the yield of adiponitrile and the total conversion of 1,4-dichlorobutane but markedly reduces the production of tars and, more especially, ethers. This action of calcium chloride is specific. Other soluble calcium salts such as calcium bromide may, however, be effective in this application.

The quantity of calcium chloride employed is not strictly critical. For best results it should comprise between about 10 and 20% of the weight of the sodium cyanide employed. Preferably, the chloride is made up in solution with the cyanide but it may be made up and added separately, if desired. If a single solution is employed, the calcium chloride will comprise about 3 to 30% by weight thereof.

Conditions of temperature and pressure may approximate closely those shown by the aforesaid application S. N. 408,582 but are not restricted thereto. Calcium chloride may, in fact, be used generally within cyanation systems for 1,4-dichlorobutane employing wet adiponitrile as the cyanation solvent. Preferably, however, atmospheric pressure and a temperature of 130–150° C. is utilized, with around 140° C. being preferred. It is also preferred that excess water be removed from the reaction mixture by the flash reaction technique, but employment of this technique is optional and not essential.

Having described my invention, I claim:

1. In the process for making adiponitrile by the reaction of 1,4-dichlorobutane with sodium cyanide in a reaction solvent consisting essentially of wet adiponitrile, the step of adding calcium chloride to the reaction solvent to improve the yield and suppress the by-products of the reaction.

2. The process which comprises adding to a mixture of 1,4-dichlorobutane and adiponitrile an aqueous solution of sodium cyanide containing calcium chloride.

3. The process of claim 2 in which the aqueous solution contains 30–40% by weight of sodium cyanide and 3–30% by weight of calcium chloride.

4. The process of making adiponitrile which comprises reacting 1,4-dichlorobutane dissolved in adiponitrile with an aqueous solution of sodium cyanide and calcium chloride at atmospheric pressure and a temperature of 130–150° C.

5. The process of claim 4 in which the aqueous solution contains 30–40% by weight of sodium cyanide and 3–30% by weight of calcium chloride and the temperature is around 140° C.

References Cited in the file of this patent

UNITED STATES PATENTS

| | | |
|---|---|---|
| 1,615,637 | Lehrecke | Jan. 25, 1927 |
| 2,342,101 | Cass | Feb. 22, 1944 |
| 2,415,261 | Rogers | Feb. 4, 1947 |